April 20, 1954  R. DEIBEL  2,675,958

ROTARY PUMP

Filed Feb. 14, 1951

Inventor
Raymond Deibel
By
Bean, Brooks, Buckley & Bean
Attorneys

Patented Apr. 20, 1954

2,675,958

UNITED STATES PATENT OFFICE 2,675,958

ROTARY PUMP

Raymond Deibel, East Aurora, N. Y., assignor to Trico Products Corporation, Buffalo, N. Y.

Application February 14, 1951, Serial No. 210,958

10 Claims. (Cl. 230—207)

This invention relates generally to the pumping art, and more specifically to a lubricating accessory for use with a rotary pump.

In rotary pumps, as with most machinery, continuous lubrication of moving parts is a prerequisite to long life and satisfactory operation. Therefore, means must be provided whereby at least the rotor bearing is continuously lubricated. However, it has been found that in the course of time some of the lubricant thus used will find its way through the pump and into the exhaust thereof, which situation is undesirable for two reasons. First, it is wasteful in that new lubricant must be continuously added to the pump, and second, lubricant appearing in the pump exhaust decreases the efficiency of the pump and is apt to adversely effect equipment being operated thereby.

By way of example, many automotive accessories are pneumatically operated, and the necessary air pressure is frequently obtained from a rotary pump driven by means of an electric motor. The accessory, which may be a pneumatic window lift, convertible top mechanism, seat adjuster, and the like, is connected in an appropriate manner to the exhaust side of a pump. Then, upon energizing the electric motor to drive the pump, sufficient pressure will be created to operate the accessory. However, some of the lubricant applied to the rotor shaft will work its way through the pump and become entrained in the exhaust thereof. As a result, lubricant must be continuously added to the pump, even though the entrained lubricant would still be satisfactory for lubricating purposes, and also, the presence of entrained lubricant in the pump exhaust will decrease the efficiency of the pump and thus impair the operation of the accessory, and might actually damage the accessory.

Thus, a problem of considerable significance is presented, and this problem arises not only in connection with pneumatically operated automotive accessories, but also in numerous other types of pressure-operated equipment which utilize a pump.

Accordingly, it is an object of this invention to provide a pump accessory which incorporates means for separating or otherwise filtering entrained lubricant from the pump exhaust.

Another object of this invention is to provide a pump accessory having means for reusing such separated lubricant for lubricating purposes.

In addition, it is an object of this invention to provide a lubricant separating and regulating means for use in connection with a rotary pump.

A further object of this invention is to provide a lubricant separating and regulating means of the aforementioned type which is relatively inexpensive to manufacture, simple and compact in construction, and reliable in operation.

These and additional objects will become apparent from the ensuing detailed description and the accompanying drawing wherein.

Figure 1:
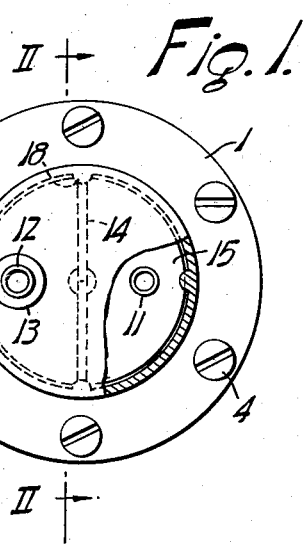
Fig. 1 is a plan view, partly in section, of the lubricant separator and regulator of the present invention.
Figure 2:
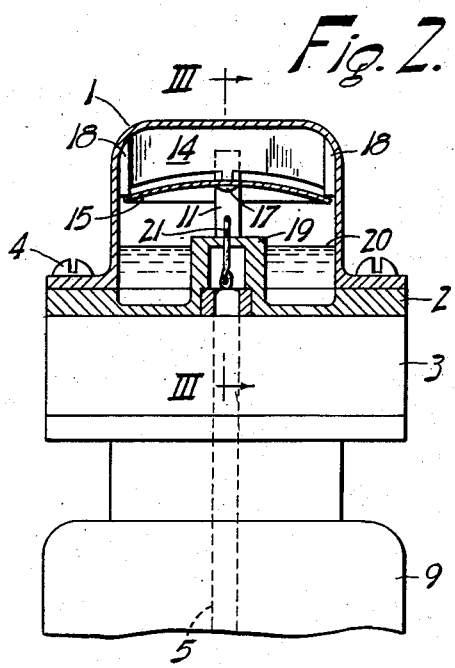
Fig. 2 is a sectional view taken along the line II—II of Fig. 1, and showing schematically the lubricant separator and regulator in combination with a rotary pump and an electric motor.
Figure 3:
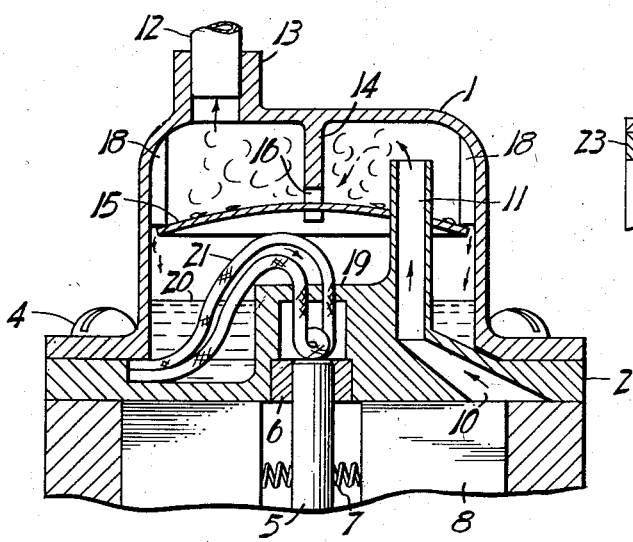
Fig. 3 is a sectional view taken along line III—III of Fig. 2.

The pump accessory of the present invention comprises an open-ended casing 1 and an end plate 2. Casing 1, together with end plate 2, forms a cover for the exhaust side of rotary pump 3, and is secured thereto by means of a plurality of screws 4. Rotary pump 3 comprises the usual rotor shaft 5 journaled in a bearing 6 and carrying a spring 7 which extends therethrough and acts to bias rotor vanes 8 outwardly. Pump 3 is connected in a conventional manner with an electric motor 9, whereby energization of motor 9 will drive pump 3 to produce the desired pressure.

An exhaust port 10 extends through end plate 2 and connects with an exhaust pipe 11 which is formed integral with end plate 2. Exhaust port 10 is so arranged that it receives the exhaust of pump 3. A pressure line 12, adapted for connection at one end to an accessory, not illustrated, is connected at its other end to a connection 13 on casing 1. Thus, the exhaust of pump 3 is caused to pass through port 10, pipe 11, casing 1, and pressure line 12.

However, as previously indicated, lubricant often becomes entrained in the pump exhaust. The present invention separates any such entrained lubricant from the exhaust and returns it to the pump rotor in the following manner.

A depending baffle 14 extends across casing 1 in the path of the pump exhaust. A drip plate 15, mounted a slight distance below baffle 14, extends nearly across casing 1, and is held in position by means of a projection 16 on baffle 14, which projection extends through an aperture in the center of drip plate 15 and is peened to the underside thereof, as at 17. Drip plate 15 has a second aperture therein through which extends exhaust pipe 11, whereby as the pump exhaust passes through casing 1, lubricant entrained therein is separated therefrom by means of baffle 14, and falls on drip plate 15. Drip plate 15 is dished upwardly, as illustrated, and does not extend completely across casing 1. A plurality of bosses 18 on the inner side of casing 1 abut the upper side of drip plate 15 so as to secure the drip plate tightly in position and prevent it from contacting the wall of casing 1. Therefore, separated lubricant falling on drip plate 15 is caused to drip down from the outer periphery thereof under the influence of gravity. Thus, the present invention separates, or in effect filters, entrained lubricant from the pump exhaust.

End plate 2 has a hollow boss 19 extending inwardly therefrom, which boss is adapted to fit over bearing 6. As the lubricant falling onto drip plate 15 drips from the outer periphery thereof, it collects in the annular channel formed by casing 1, end plate 2, and boss 19, forming a pool 20 therein. A wick 21 extends from pool 20 through an aperture in boss 19 into contact with rotor shaft 5, and back through another aperture in boss 19 to pool 20. The lubricant in pool 20 is drawn along wick 21 by capillary action, and is thus returned to rotor shaft 5 and bearing 6 for lubricating the same. It is noted that wick 21 extends downwardly into boss 19, whereby the capillary action will be assisted by the influence of gravity, and is coiled within boss 19 whereby to provide a greater area of contact with rotor shaft 5.

To summarize the operation of this embodiment of the present invention, the pump exhaust passes from pump 3 through exhaust port 10, pipe 11, casing 1, connection 13 and pressure line 12. Lubricant entrained in this exhaust is separated therefrom by baffle 14, and is caused to fall on drip plate 15. As it drips from drip plate 15, the lubricant collects in pool 20, and the lubricant in pool 20 is returned along wick 21 to rotor shaft 5 by a combination of capillary action and gravity flow. Thus, the present invention separates entrained lubricant from the pump exhaust and regulates its return to the pump for lubricating purposes.

It is noted that the present invention can be formed either as a part of the rotary pump, or as a separate unit adapted for attachment to the exhaust side of such a pump.

Figure 4:
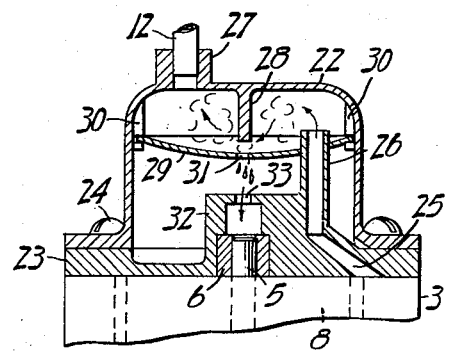
Fig. 4 is a sectional view of a modified form of lubricant separator and regulator.

A modification of the present invention is illustrated in Fig. 4, and comprises a casing 22 and an end plate 23. Casing 22 and end plate 23 are secured together and to the exhaust side of rotary pump 3 by means of screws 24, and thus form a cover for the exhaust side of said pump. End plate 23 has an exhaust port 25 extending therethrough and connecting to a pipe 26 integral therewith. Casing 22 has a connection 27 adapted to receive pressure line 12, and exhaust port 25 is adapted for communication with the exhaust outlet of a rotary pump 3. Thus, the pump exhaust passes through exhaust port 25, pipe 26, casing 22, and connection 27 to pressure line 12.

Casing 22 has a depending baffle 28 extending thereacross in the path of the pump exhaust. A drip plate 29 extends across casing 22 slightly below baffle 28 and in a plane substantially transverse to the plane of baffle 28, and is held in position by means of notched bosses 30. Drip plate 29 is dished downwardly, and has an opening 31 in the center thereof. Also, drip plate 29 has an aperture through which extends pipe 26.

End plate 23 has a hollow boss 32 extending inwardly therefrom and adapted to fit over bearing 6. Boss 32 has an opening 33 therein, which opening is aligned with opening 31 and rotor shaft 5.

The operation of this modification is as follows. As the pump exhaust passes through casing 22, entrained lubricant is separated therefrom by baffle 28. The lubricant falls onto drip plate 29, and drips through opening 31 therein under the influence of gravity. The lubricant then passes through opening 33, still being acted upon by the pull of gravity, and onto rotor shaft 5 and bearing 6 where it lubricates the same.

Therefore it is apparent that the present invention fully accomplishes its aforesaid objects. Not only does it separate entrained lubricant from the pump exhaust, whereby it acts as a filter, but it also regulates the return thereof to the rotor shaft and bearing.

Obviously, this invention is susceptible of numerous modifications, and it is intended to cover all such modifications as may fall within the scope of the appended claims.

Having fully disclosed and described the present invention, and the mode of operation thereof, what is claimed as new is as follows:

1. A cover assembly for a pump comprising an end plate adapted to cover the exhaust side of a pump, a housing secured to said end plate, a depending inwardly extending baffle across the top portion of said housing, a generally horizontally disposed drip plate extending across the interior of said housing beneath said baffle, an exhaust passageway extending through said end plate to a point beyond said drip plate at one side of said baffle, and an outlet leading from the top of said housing at the other side of said baffle, said drip plate having drainage means providing gravity liquid flow downwardly from said drip plate, whereby entrained lubricant will be separated from the pump exhaust as it passes through said cover assembly.

2. A unitary top cover assembly for a pump comprising an end plate adapted to cover the exhaust side of a pump, a housing secured to said end plate, depending baffling means extending across the top portion of said housing, a horizontally disposed dished drip plate extending across the interior of said housing between said baffling means and said end plate, an exhaust passageway extending through said end plate to a point beyond said drip plate at one side of baffling means, and an outlet leading from the top portion of said housing, at the other side of said baffling means, whereby entrained lubricant will be separated from a pump exhaust as it passes through said cover assembly, said drip plate being constructed and arranged to permit lubricant so separated to drip therefrom into the lower portion of said housing.

3. In a rotary pump having a vertical rotor shaft and an exhaust side, a top end plate secured to said exhaust side, a hollow boss extending upwardly said end plate and enclosing one end of said rotor shaft, said boss having a top opening, a housing secured to said end plate, an outlet extending from said housing, an inlet in said end plate, a tortuous passageway extending through the upper part of said housing between said inlet and said outlet whereby lubricant entrained in the pump exhaust will be separated therefrom, and means conducting such separated lubricant to the interior of said hollow boss through said top opening, said means consisting of free flow means including gravity feed means.

4. In combination with a pump having a rotor shaft and an exhaust side, an end plate secured to said exhaust side, a hollow boss on said end plate enclosing one end of said rotor shaft, a housing secured to said end plate, an outlet extending from said housing, baffling means adjacent the top portion of said housing, a dished drip plate mounted between said end plate and said baffling means, and an inlet extending from said end plate through said drip plate, whereby entrained lubricant will be separated from the pump exhaust passing through said housing, said dished drip plate and said hollow boss containing aligned apertures whereby lubricant so separated will drip directly onto said one end of said rotor shaft.

5. In combination with a pump having a rotor shaft and an exhaust side, an end plate secured to said exhaust side, a hollow boss on said end plate enclosing one end of said rotor shaft, a housing secured to said end plate, an outlet extending from said housing, baffling means adjacent the top portion of said housing, a dished drip plate mounted between said end plate and said baffling means, an inlet extending from said end plate through said drip plate, whereby entrained lubricant will be separated from the pump exhaust as it passes through said housing, and means including a wick member in contact with the interior of the boss structure for conveying lubricant so separated to said one end of said rotor shaft.

6. In a rotary pump having a vertical rotor shaft and a top opening exhaust side, a hollow top cover member secured to said exhaust side and embracing the end of said shaft, said cover having an upper chamber having a top outlet and a lower chamber having a boss extending upwardly from the bottom thereof and embracing said shaft, an opening in the top of said boss, a generally horizontally disposed drip plate separating said chambers, a pipe communicating with said exhaust side and extending into and terminating upwardly in said upper chamber, a depending baffle extending downwardly from the top wall of said upper chamber between said outlet and said pipe into proximity with said drip plate, and drainage means conducting liquid flow from said drip plate into said boss through the top opening therein, the parts being arranged to define a tortuous exhaust flow from said pump through said pipe and through said upper chamber between said baffle and said drip plate to said outlet whereby entrained lubricant is separated from the pump exhaust and accumulates on said drip plate and being further arranged to provide a return liquid flow from said upper chamber along said baffle and across said drip plate and to said shaft, said liquid flow being clear of the end of said pipe.

7. In a rotary pump having a rotor shaft and an exhaust side, a hollow cover member secured to said exhaust side and embracing the end of said shaft, said cover having an upper chamber having a top outlet at one side and a lower chamber having a part embracing said shaft, a generally horizontally disposed dished drip plate separating said chambers, a pipe communicating with said exhaust side and extending into and terminating upwardly in said upper chamber at the opposite side thereof from said outlet, a depending baffle extending downwardly from the top wall of said upper chamber approximately medially between said outlet and said pipe into proximity with said drip plate, the parts being arranged to define a tortuous exhaust flow from said pump through said pipe and through said upper chamber between said baffle and said drip plate to said outlet whereby entrained lubricant is separated from the pump exhaust and accumulates on said drip plate, and means including said drip plate constructed and arranged to provide a return liquid flow from said upper chamber into said lower chamber and to said shaft, said liquid flow being clear of the end of said pipe.

8. In a rotary pump having a vertical rotor shaft and a top opening exhaust side, a hollow top cover member secured to said exhaust side and embracing the end of said shaft, said cover having an upper chamber having a top outlet at one side and a lower chamber having a boss extending upwardly from the bottom thereof and embracing said shaft, an overflow reservoir adjacent said boss, an opening in the top of said boss, a horizontally disposed dished drip plate separating said chambers, a pipe communicating with said exhaust side and extending into and terminating upwardly in said upper chamber at the opposite side thereof from said outlet, a depending baffle extending downwardly from the top wall of said upper chamber approximately medially between said outlet and said pipe into proximity with said drip plate, and drainage means conducting liquid flow from said drip plate into said boss through the top opening therein, the parts being arranged to define a tortuous exhaust flow from said pump through said pipe and through said upper chamber between said baffle and said drip plate to said outlet whereby entrained lubricant is separated from the pump exhaust and accumulates on said drip plate and further arranged to provide a return liquid flow from said upper chamber along said baffle and across said drip plate and to said shaft, said liquid flow being clear of the end of said pipe.

9. In combination with a pump having a vertical rotor shaft and an exhaust side, a top end plate secured to said exhaust side, an upwardly extending hollow boss on said end plate enclosing one end of said rotor shaft, a housing superimposed on said end plate, a top outlet extending from said housing at one side thereof, a baffle depending from the top wall of said housing, an upwardly dished drip plate mounted horizontally between said end plate and said baffling means with a peripheral clearance from the sides of said housing, an inlet extending from said end plate through said drip plate at the opposite side of said housing from said outlet, whereby entrained lubricant will be separated from the pump exhaust as it passes through said housing, and a wick member extending from said end plate into the boss structure in contact with said shaft.

10. In a rotary pump having a vertical rotor shaft and a top opening exhaust side, a hollow top cover member secured to said exhaust side and embracing the end of said shaft, said cover having an upper chamber having a top outlet at one side and a lower chamber having a hollow boss extending upwardly from the bottom thereof and embracing said shaft, an overflow reservoir adjacent said boss, an opening in the top of said boss, a horizontally disposed downwardly dished drip plate separating said chambers, a pipe communicating with said exhaust side and extending into and terminating upwardly in said upper chamber at the opposite side thereof from said outlet, a depending baffle extending downwardly from the top wall of said upper chamber approximately medially between said outlet and said pipe into proximity with said drip plate, and a central aperture in said drip plate vertically aligned with the top opening of said boss, the parts being arranged to define a tortuous exhaust flow from said pump through said pipe and through said upper chamber between said baffle and said drip plate to said outlet whereby entrained lubricant is separated from the pump exhaust and accumulates on said drip plate and further arranged to provide a return liquid flow from said upper chamber along said baffle and across said drip plate and to said shaft, said liquid flow being clear of the end of said pipe.

References Cited in the file of this patent

UNITED STATES PATENTS

| Number | Name | Date |
|---|---|---|
| 321,669 | Wood | July 7, 1885 |
| 1,500,361 | Brockway | July 8, 1924 |
| 1,590,384 | Kucher | June 29, 1926 |
| 1,626,557 | Rolaff | Apr. 26, 1927 |
| 2,153,349 | Squiller | Apr. 4, 1939 |
| 2,272,926 | Squiller | Feb. 10, 1942 |
| 2,455,297 | Curtis | Nov. 30, 1948 |

FOREIGN PATENTS

| Number | Country | Date |
|---|---|---|
| 78,583 | Switzerland | Mar. 11, 1918 |
| 444,610 | Great Britain | Mar. 24, 1936 |
| 453,565 | France | Apr. 7, 1913 |
| 789,561 | France | Oct. 31, 1935 |